United States Patent [19]

Reinke

[11] 3,917,171
[45] Nov. 4, 1975

[54] PROPELLING PIPE SUPPORT TOWER FOR PIVOT IRRIGATION SYSTEMS

[76] Inventor: Elmer E. Reinke, Rural Rte., Davenport, Nebr. 68335

[22] Filed: Jan. 30, 1975

[21] Appl. No.: 545,716

[52] U.S. Cl. .................... 239/177; 239/212; 180/4; 180/8 D
[51] Int. Cl.² .................... B05B 3/02; B62M 27/02; B62M 29/02
[58] Field of Search ........... 239/177, 212, 178, 191; 180/8 C, 8 D, 8 E, 4; 137/344

[56] References Cited
UNITED STATES PATENTS

| | | | |
|---|---|---|---|
| 3,302,656 | 2/1967 | Boone | 239/177 X |
| 3,373,939 | 3/1968 | Dowd | 180/4 X |
| 3,386,661 | 6/1968 | Olson et al. | 239/177 |
| 3,500,856 | 3/1960 | Boone et al. | 239/177 X |
| 3,533,556 | 10/1970 | Dowd | 239/177 |
| 3,866,835 | 2/1975 | Dowd | 239/177 |

Primary Examiner—Robert S. Ward, Jr.
Attorney, Agent, or Firm—Clarence A. O'Brien; Harvey B. Jacobson

[57] ABSTRACT

An inverted V-shaped tower including downwardly divergent front and rear legs equipped with lower end ground-engaging skids is provided and the lower end portions of the legs are interconnected by means of a horizontal brace extending and connected therebetween. An inclined power leg has its upper end engaged with the front leg for guided movement therealong and the lower end of the power leg is vertically shiftable relative to the end of the brace adjacent the rear leg of the tower when the power leg is forced downwardly relative to the tower. As the power leg is elevated relative to the tower the lower end of the power leg is engageable with the rear end of the horizontal brace and movable forwardly along the latter during further upward movement of the power leg to a predetermined forward position preparatory to again being driven downwardly relative to the tower. An intermittently operable double-acting cylinder is connected between the upper apex of the tower and the power leg intermediate its opposite ends. Extension of the cylinder results in a downward force being applied to the power leg intermediate its opposite ends and the lower end of the power leg is thus driven downwardly and rearwardly to propel the tower forwardly. As the cylinder is retracted, the power leg is lifted relative to the tower and the lower end of the leg engages and is guided forwardly along the brace to a predetermined position from which the lower end of the power leg will be moved downwardly as a result of the next extension of the cylinder.

11 Claims, 6 Drawing Figures

PROPELLING PIPE SUPPORT TOWER FOR PIVOT IRRIGATION SYSTEMS

BACKGROUND OF THE INVENTION

Support towers for pivot-type irrigation systems are provided with various drive assemblies. Some drive assemblies include driven ground-engaging support wheels and other drive assemblies include other ground-engaging structures for propelling the towers in forward directions.

Most irrigation tower propelling assemblies are subject to loss of ground traction when moving through slightly depressed areas in which irrigation water may have collected to render the ground extremely soft and there is accordingly a need for an improved tower drive assembly which will be operable even on soft ground surfaces.

Examples of irrigation tower drive systems including some of the basic structural features of the invention are disclosed in U.S. Pat. Nos. 2,892,593, 3,268,174, 3,302,656, 3,500,856 and 3,533,556.

BRIEF DESCRIPTION OF THE INVENTION

The irrigation pipe support tower of the instant invention is conventional in general overall shape in that it is inverted V-shaped in configuration. The lower ends of the legs of the tower are equipped with ground-engaging skids and a forwardly and upwardly inclined power leg has its upper end guidingly engaged with the forward leg of the tower for movement therealong while the lower end of the power leg is projectable downwardly and rearwardly relative to the tower and includes structure coacting with the tower for limiting upward movement of the lower end of the power leg and guiding the lower end of the power leg forwardly to a predetermined forward position upon upward movement of the power leg. A double-acting hydraulic cylinder is operatively connected between the upper apex portion of the tower and the power leg intermediate its opposite ends and suitable control means is provided for intermittently operating the double-acting cylinder.

The lower end of the power leg is equipped with a large horizontal cross-sectional area foot for engagement with the ground and which will be capable of forwardly and upwardly displacing the associated tower for ease in its movement in a horizontal direction upon each actuation of the hydraulic cylinder through a power stroke thereof.

The main object of this invention is to provide a drive system for an irrigation pipe supporting tower which will be capable of obtaining sufficient ground traction to drive the tower even when the tower is moving over soft ground surfaces. Another object of this invention, in accordance with the immediately preceding object, is to provide an irrigation pipe supporting tower drive mechanism which may be actuated by means of a simplified motor system such as a double-acting cylinder.

A still further important object of this invention is to provide a propelling or drive system for an irrigation pipe support tower and including control means whereby precise actuation of the drive means of a plurality of towers disposed in aligned positions may be carried out in order that the irrigation pipe of a pivot irrigation system may be maintained substantially straight.

A final object of this invention to be specifically enumerated herein is to provide a propelling pipe support tower for pivot irrigation systems which will conform to conventional forms of manufacture, be of simple construction and efficient in operation so as to provide a device that will be economically feasible, long lasting and relatively trouble free in operation.

These together with other objects and advantages which will become subsequently apparent reside in the details of construction and operation as more fully hereinafter described and claimed, reference being has to the accompanying drawings forming a part hereof, wherein like numerals refer to like parts throughout.

DETAILED DESCRIPTION OF THE INVENTION

Figure 1:
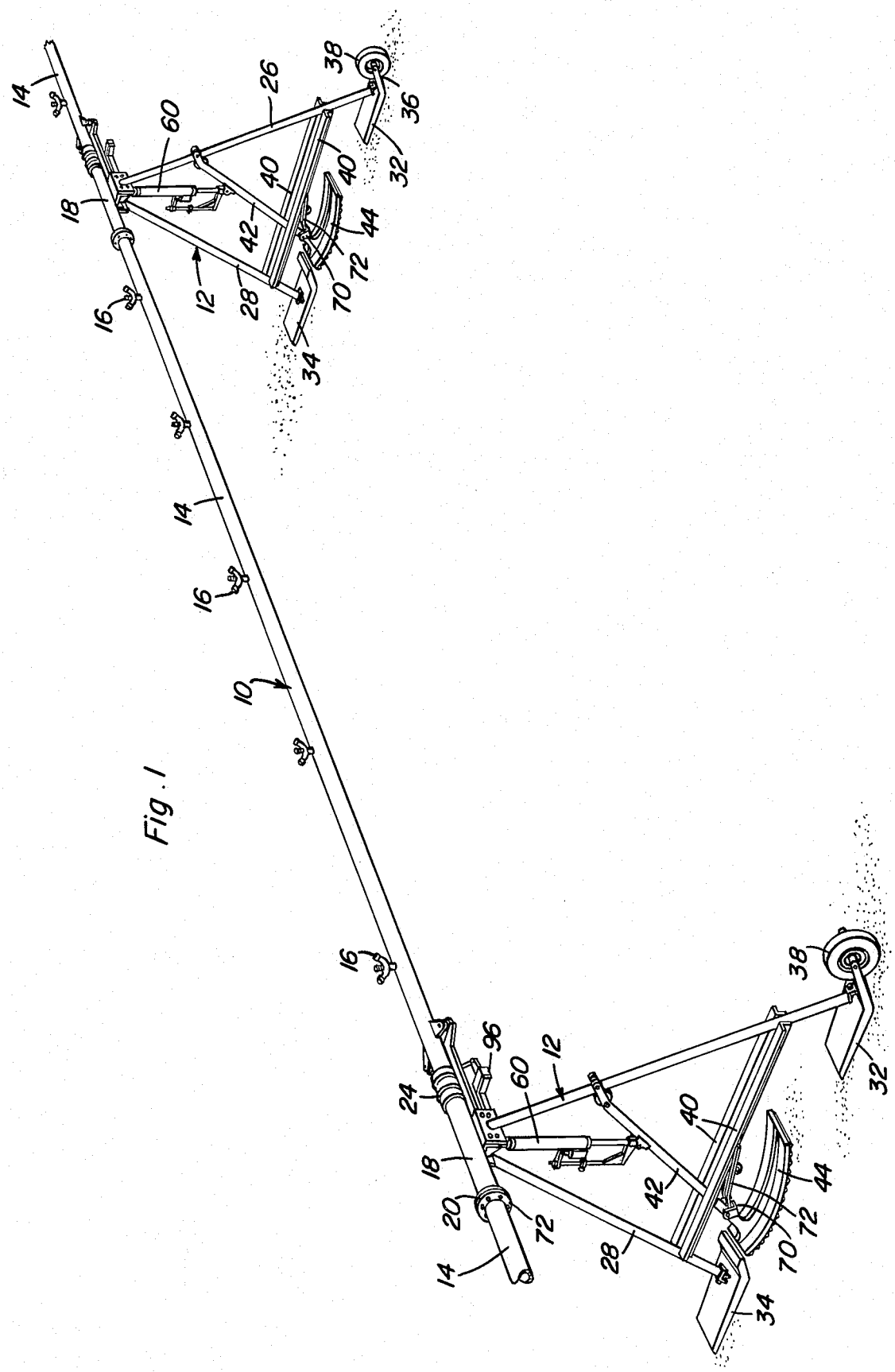
FIG. 1 is a fragmentary perspective view of a pivot-type irrigation system with a pair of support towers constructed in accordance with the present invention maintaining the irrigation pipe sections in elevated position.

Referring now more specifically to the drawings, the numeral 10 generally designates a pivot-type irrigation system including a plurality of support towers 12 supporting end aligned and communicated irrigation pipe sections 14 equipped with longitudinally spaced sprinkler heads 16. Adjacent ends of the sections 14 are interconnected by means of connector sections 18 supported from the upper apex portions of the towers 12 and one end of each section 18 is flanged as at 20 for substantially rigid coupling to a similar flanged end 22 of the adjacent section 14. However, the opposite ends of the sections 18 are coupled to the adjacent ends of the sections 14 by means of flex joint couplings 24.

Each of the towers 12 includes a pair of front and rear downwardly divergent legs 26 and 28 which are rigidly interconnected at their upper ends by means of a bracing structure 30 from which the corresponding section 18 is supported. The lower end of the front leg 26 is equipped with a skid 32 and the lower end of the rear leg 28 is equipped with a similar skid 34. However, the forwardly upwardly inclined portion 36 of the front skid 32 is bifurcated and supports an optional ground wheel 38 therefrom for assistance in smoothly guiding the lower end of the front leg 26 of the tower 12 over rough ground.

The lower ends of the legs 26 and 28 are rigidly interconnected by means of a pair of parallel angle iron brace members 40 extending therebetween and the spacing between the angle iron braces 40 defines a slot through which the lower end of an associated power leg 42 is slidably received.

The lower end portion of the power leg 42 which projects below the braces 40 is equipped with a wide arcuate shoe 44 for engagement with the ground 46 on which the skids 32 and 34 rest. The undersurface of the shoe 44 is corrugated as at 48 and the leg 42 is forwardly and upwardly inclined and includes a bifurcated upper end portion 50. A small diameter roller 54 is journaled between the terminal ends of the furcations 56 and a larger diameter guide wheel 58 is journaled between the inner ends of the furcations 56. The small diameter roller 54 is guidingly engageable with the forwardly facing side of the leg 26 and the wheel 58 is rollingly engageable with the rearwardly facing side of the leg 26.

A double-acting hydraulic cylinder 60 has its upper end oscillatably supported from the brace structure 30 as at 62 and the lower extendable and retractable piston rod portion 64 of the hydraulic cylinder 60 is bifurcated and pivotally secured to a mount 66 carried by the power leg 42 as at 68.

Figure 2:
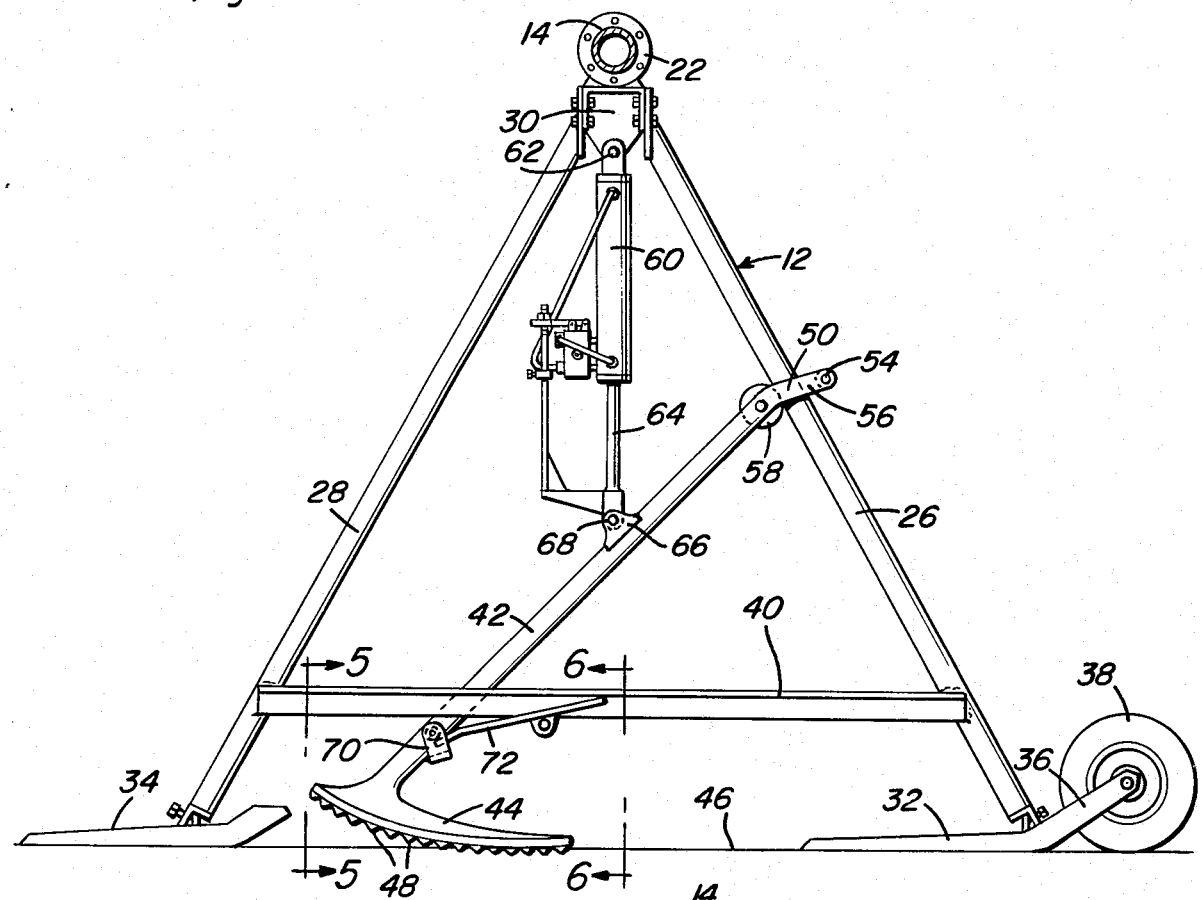
FIG. 2 is an enlarged end elevational view of the left hand end of the structure illustrated in FIG. 1 and with the power leg of the support tower illustrated in position at the beginning of its re-trace or inactive cycle.
Figure 3:
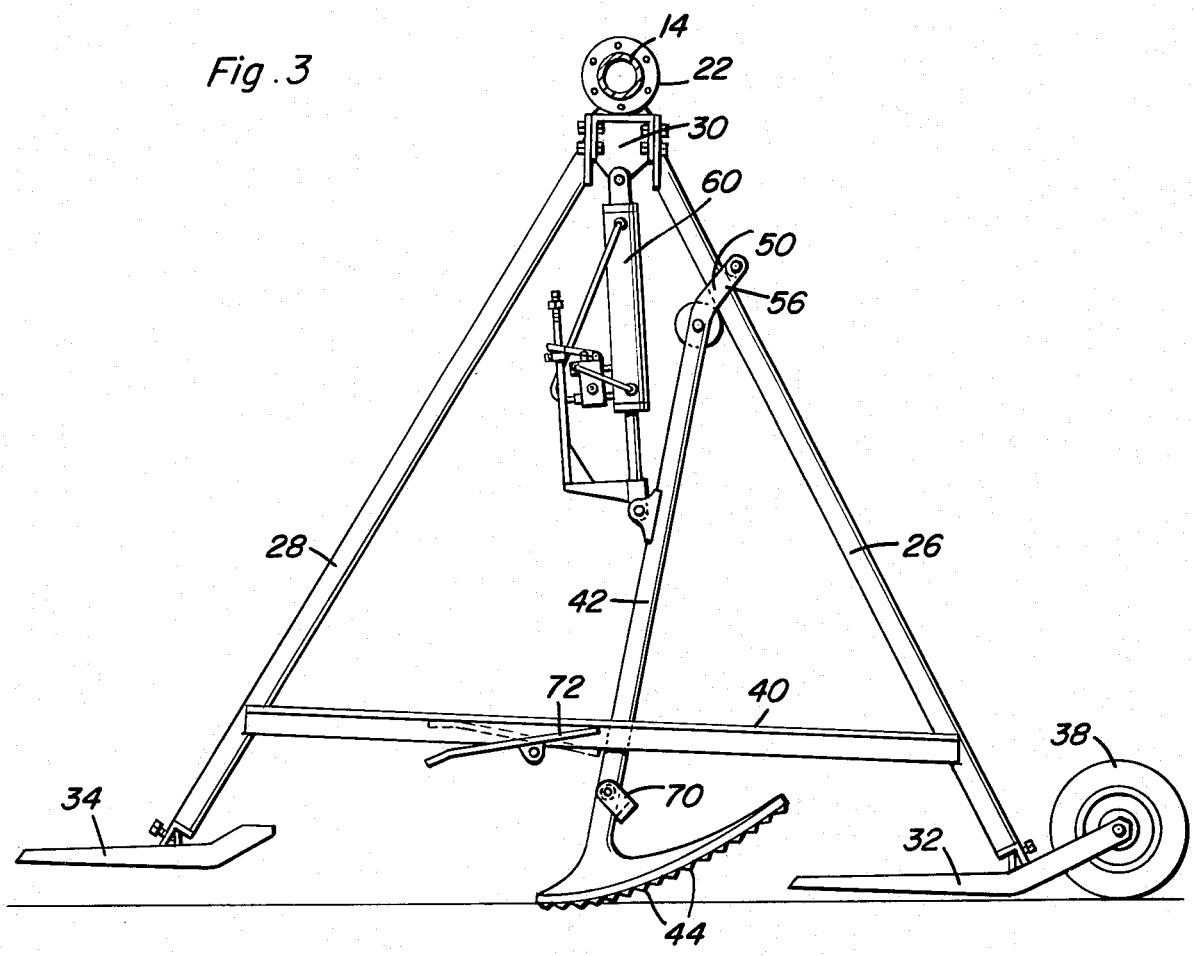
FIG. 3 is an end elevational view similar to FIG. 2 but illustrating the power leg of the support tower positioned at the beginning of its power cycle.
Figure 5:
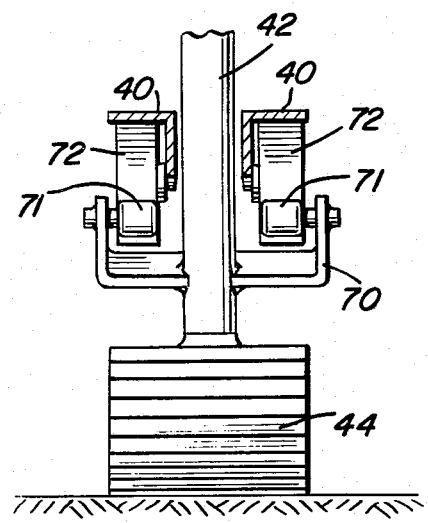
FIG. 5 is a fragmentary enlarged transverse vertical sectional view taken substantially upon the plane indicated by the section line 5—5 of FIG. 2.
Figure 6:
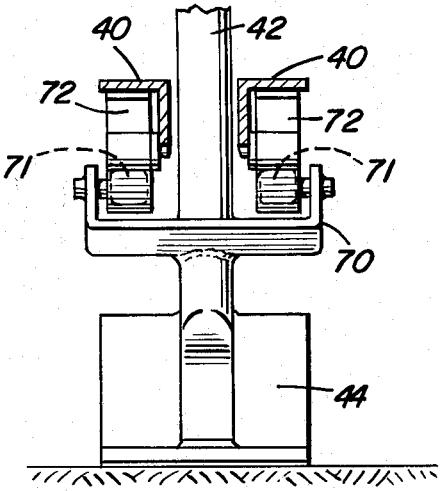
FIG. 6 is an enlarged fragmentary transverse vertical sectional view taken substantially upon the plane indicated by the section line 6—6 of FIG. 2.

The lower end of the power leg 42 has a guide structure 70 supported therefrom including rollers 71 journaled therefrom and rollingly guidingly engageable with a pair of guide bars 72 oscillatably supported from the braces 40. As may best be seen from a comparison of FIGS. 2 and 3 of the drawings, as the hydraulic cylinder 60 has its piston rod portion 64 retracted, the power leg 42 is elevated from the position thereof illustrated in FIG. 2 of the drawings with the upper end of the power leg 42 guided upwardly along the leg 26 and the lower end of the leg 42 moved upwardly with the guide structure rollers 71 engaged with the guide bars 72. The engagement of the guide structure 70 with the bars 72 limits upward displacement of the power leg 42 thus causing the guide structure 70 to move forwardly along the guide bars 72 until the rollers 71 move off the forward end of the guide bars 72 at which point the hydraulic cylinder 60 is almost fully retracted. Then, the hydraulic cylinder 60 is retained in the fully retracted position until such time as it is desired to move the tower 12 forwardly. Upon downward extension of the piston rod portion 64, the power leg 42 is lowered into engagement with the ground in the position thereof illustrated in FIG. 3 of the drawings. Thereafter, further extension of the piston rod portion 64 causes a substantial portion of the weight of the tower 12 to be transferred to the power leg 42 and the latter has a rearward and downward thrust applied thereto resulting in a forward and upward thrust being applied to the tower 12 in order to advance the latter forwardly.

Figure 4:
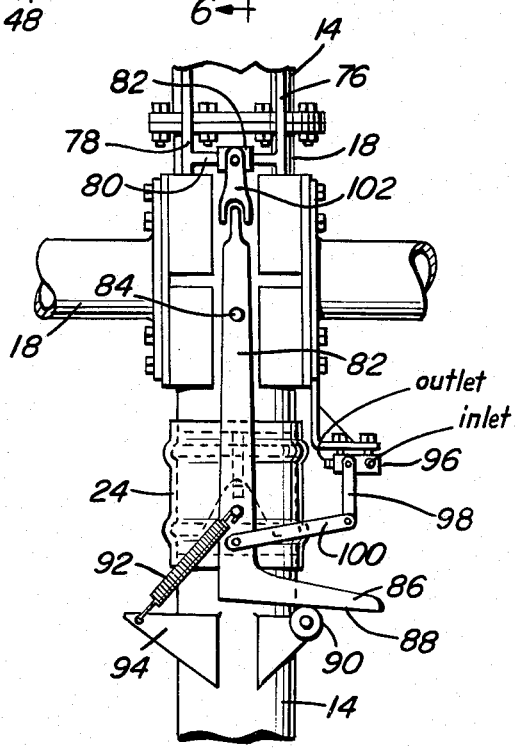
FIG. 4 is a fragmentary bottom plan view of the upper portion of one of the support towers and illustrating the actuating control for the drive system actuating double-acting cylinder.

With attention now invited more specifically to FIG. 4 of the drawings it may be seen that a pressure line 76 and return line 78 extend along beneath each section 18 and that a bypass line 80 having a valve 82 therein is connected between the pressure and return lines 76 and 78. Further, a control lever 82 is pivotally supported from each section 18 as at 84 and one end of the lever 82 includes a right-angulated leg 86 including a guide surface 88 engaged with a roller 90 journaled from the adjacent section 14. The lever 82 is spring-biased in a clockwise direction as viewed in FIG. 4 by means of an expansion spring 92 connected between the free end of the lever 82 and a mount or anchor member 94 carried by the section 14. A control valve 96 is supported from the section 18 and includes an actuator 98. A connecting link 100 is pivotally connected between the actuator 98 and the free end of the lever 82 whereby relative angular displacement between the two sections 14 will cause the valve 96 to open and the cylinder 60 to be actuated. In addition, the end of the lever 92 remote from the leg 86 is operatively connected, by means of a lost motion connection, to an actuator 102 of the valve 82 whereby in the event of failure of the hydraulic cylinder 60 or other part of the driving system rendering the drive for the tower incapable of advancing the tower, the pressure line 76 will be communicated with the return line 78 in order to stop the driving of all of the towers 12 as soon as one pair of adjacent ends of the sections 14 are angularly displaced beyond a predetermined amount.

A further important aspect of drive mechanism for each tower 12 is the rocker shape of the corresponding shoe 44 and the manner in which the supportive power leg 42 is driven by the corresponding cylinder 60. In driving the tower 12, the shoe is angularly displaced as well as vertically shifted relative to the tower 12 and therefore "rolls" over the ground 46 during each driving stroke of the power leg 42.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An irrigation pipe supporting and propelling tower including an upstanding frame including upstanding front and rear members interconnected at their lower end portions by means of a front to rear brace structure extending and secured therebetween, said front member including a forwardly and downwardly inclined portion intermediate its upper and lower ends, the lower portion of said lower end including front and rear spaced large plan area ground engaging support members, a forwardly and upwardly inclined power leg disposed between said front and rear members, the upper end portion of said leg being pivotally and slidably supported from said inclined portion, the lower end portion of said leg and said brace structure including coacting means for guiding said leg for lengthwise shifting of the latter relative to said guide structure and movement of the lower end portion of said leg along said brace structure against lateral deflection relative thereto, said coacting means also including cam means operative to cam said lower end portion forward from a predetermined rear position in response to said leg being elevated from a predetermined lower position while disposed in said rear position, and motor means between said frame and a central portion of said power leg intermediate said upper and lower end portions operative to intermittently raise and lower said central portion, the lower terminal end of said leg including a large plan area ground engaging foot displaceable downwardly below and upwardly above a horizontal plane containing said support members upon actuation of said motor means to lower and raise, respectively, the central portion of said leg.

2. The combination of claim 1 wherein said frame comprises an inverted V-shaped frame including upwardly convergent front and rear legs comprising said front and rear members, respectively.

3. The combination of claim 2 wherein the upper portion of said frame mounts a horizontal pipe portion disposed in a front to rear extending vertical plane.

4. The combination of claim 1 wherein said support members comprise front to rear extending wide skid members including forwardly and upwardly directed forward ends.

5. The combination of claim 4 wherein the forward end of the front support member includes a journaled ground engaging wheel.

6. The combination of claim 1 wherein said brace structure comprises a pair of opposite side front to rear extending members defining an upstanding slot therebetween in which the lower end portion of said leg is guidingly slidable, said opposite side members and opposite side surfaces of said leg disposed in said slot comprising a portion of said coacting means.

7. The combination of claim 1 wherein the upper portion of said frame mounts a horizontal pipe portion disposed in a front to rear extending vertical plane, one end of said pipe portion including means for substantially rigid coupling to an adjacent irrigation pipe section aligned with said pipe portion and a second pipe section having one end thereof removably coupled to the other end of said pipe portion with said second pipe section generally aligned with said pipe portion and at least slightly angularly displaceable relative thereto about an upstanding axis, said second pipe section and said pipe portion including coacting shiftable operator means shiftable back and forth in response to relative oscillation of said second pipe section and pipe portion, said motor means including an actuator portion to which said operator is operatively connected.

8. In combination with a plurality of upstanding towers including independently operable fluid motor actuated drive means for driving said towers in generally parallel directions over a support surface, said towers being generally aligned along a path transverse to said directions, said towers including generally aligned pipe portions supported from the upper ends thereof, a plurality of pipe sections removably coupled to and extending between adjacent ends of adjacent pipe portions with one end of each pipe section substantially rigidly coupled to the corresponding pipe portion end and the other end of each pipe section coupled to the adjacent pipe portion end for relative angulation about an upstanding axis, a loop type fluid pressure circuit extending along said pipe sections including a fluid supply line and a fluid return line, said towers each including valve controlled fluid pressure conducting means operatively communicating the corresponding fluid motor with said fluid pressure circuit, and valve actuator means for actuating the corresponding control valve in response to a predetermined minimum relative angulation between said other end of the corresponding pipe portion and the adjacent pipe section, and normally closed flow valve controlled bypass means carried by each of said towers and operatively associated with the corresponding pipe portion other end and the adjacent pipe section for opening said flow valve in response to relative angulation of said other pipe portion end and the adjacent pipe section an amount exceeding said predetermined minimum by a second predetermined amount.

9. The combination of claim 8 wherein each tower includes upstanding front and rear members interconnected at their lower end portions by means of a front to rear brace structure extending and secured therebetween, said front member including a forwardly and downwardly inclined portion intermediate its upper and lower ends, the lower portion of said lower end including front to rear spaced large plan area ground engaging support members, a forwardly and upwardly inclined power leg disposed between said front and rear members, the upper end portion of said leg being pivotably and slidably supported from said inclined portion, the lower end portion of said leg and said brace structure including coacting means for guiding said leg for lengthwise shifting of the latter relative to said guide structure and movement of the lower end portion of said leg along said brace structure against lateral deflection relative thereto, said coacting means also including cam means operative to cam said lower end portion forward from a predetermined rear position in response to said leg being elevated from a predetermined lower position while disposed in said rear position, and said motor being connected between said frame and a central portion of said power leg intermediate said upper and lower end portions operative to intermittently raise and lower said central portion, the lower terminal end of said leg including a large plan area ground engaging foot displaceable downwardly below and upwardly above a horizontal plane containing said support members upon actuation of said motor means to lower and raise, respectively, the central portion of said leg.

10. The combination of claim 9 wherein said frame comprises an inverted V-shaped frame including upwardly convergent front and rear legs comprising said front and rear members, respectively.

11. The combination of claim 10 wherein said brace structure comprises a pair of opposite side front to rear extending members defining an upstanding slot therebetween in which the lower end portion of said leg is guidingly slidable, said opposite side members and opposite side surfaces of said leg disposed in said slot comprising a portion of said coacting means.

* * * * *